(12) United States Patent
Tanaka et al.

(10) Patent No.: US 11,347,672 B2
(45) Date of Patent: May 31, 2022

(54) STORAGE APPARATUS

(71) Applicant: Hitachi, Ltd., Tokyo (JP)

(72) Inventors: Katsuya Tanaka, Tokyo (JP); Hirotoshi Akaike, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/010,691

(22) Filed: Sep. 2, 2020

(65) Prior Publication Data
US 2021/0365397 A1 Nov. 25, 2021

(30) Foreign Application Priority Data
May 25, 2020 (JP) .............................. JP2020-090612

(51) Int. Cl.
*G06F 13/40* (2006.01)
*G06F 15/173* (2006.01)

(52) U.S. Cl.
CPC .... *G06F 13/4022* (2013.01); *G06F 15/17331* (2013.01)

(58) Field of Classification Search
None
See application file for complete search history.

(56) References Cited

U.S. PATENT DOCUMENTS

| | | | |
|---|---|---|---|
| 10,459,791 B2 | 10/2019 | Tanaka et al. | |
| 10,608,640 B1* | 3/2020 | Orthner | H03K 19/17796 |
| 2010/0036992 A1* | 2/2010 | Sisto | G06F 13/387 |
| | | | 710/305 |
| 2012/0210095 A1* | 8/2012 | Nellans | G06F 12/10 |
| | | | 711/206 |
| 2019/0347125 A1* | 11/2019 | Sankaran | G06F 9/3001 |
| 2020/0104275 A1* | 4/2020 | Sen | G06F 9/544 |
| 2020/0401440 A1* | 12/2020 | Sankaran | G06F 9/30087 |
| 2021/0117249 A1* | 4/2021 | Doshi | H04L 67/1014 |
| 2021/0117340 A1* | 4/2021 | Trikalinou | G06F 12/063 |

\* cited by examiner

*Primary Examiner* — Henry Tsai
*Assistant Examiner* — Christopher A Bartels
(74) *Attorney, Agent, or Firm* — Mattingly & Malur, PC

(57) ABSTRACT

A storage apparatus in which a controller reads out a port status of a switch in a short period of time is disclosed. The storage apparatus includes a switch and a plurality of storage controllers configured to communicate with each other through the switch. The switch includes a switch processor, a plurality of data ports, a switch integrated circuit, a memory, and a management interface. One of the plurality of data ports and a management port of the management interface are connected to each other. The switch processor stores a status of the plurality of data ports acquired from the switch integrated circuit into the memory. The plurality of storage controllers access the management interface through the plurality of data ports and the management port and receive the statuses of the plurality of data ports stored in the memory from the management interface.

11 Claims, 13 Drawing Sheets

| PORT ID | ADMIN STATE | OPERATION STATUS |
|---|---|---|
| 0 | UP | UP |
| 1 | UP | DOWN |
| 2 | UP | UP |
| 3 | DOWN | DOWN |
| ⋮ | ⋮ | ⋮ |
| UPDATE INFORMATION | | |

FIG. 9

| CLASSIFICATION | PRIORITY | TRAFFIC CLASS |
|---|---|---|
| USER DATA TRANSFER | 0 | 0 |
| CONTROL DATA TRANSFER | 1 | 1 |
| PORT STATUS ACQUISITION | 2 | 2 |

FIG. 10

| 1500 | 1501 | 1502 | 1503 | 1504 |
|---|---|---|---|---|
| PORT ID | ACCEPT STATE | ADMIN STATE | OPERATION STATUS |
| 0 | UP | UP | UP |
| 1 | UP | UP | UP |
| ⋮ | ⋮ | ⋮ | ⋮ |
| 1505 UPDATE INFORMATION | | | |

FIG. 15

| 1500 | 1501 | 1502 | 1503 | 1504 |
|---|---|---|---|---|
| PORT ID | ACCEPT STATE | ADMIN STATE | OPERATION STATUS |
| 0 | DOWN | UP | UP |

FIG. 16

| 1500 | 1501 | 1502 | 1503 | 1504 |
|---|---|---|---|---|
| PORT ID | ACCEPT STATE | ADMIN STATE | OPERATION STATUS |
| 0 | DOWN | DOWN | UP |

FIG. 17

| 1500 | 1501 | 1502 | 1503 | 1504 |
|---|---|---|---|---|
| PORT ID | ACCEPT STATE | ADMIN STATE | OPERATION STATUS |
| 0 | DOWN | DOWN | DOWN |

FIG. 18

STORAGE APPARATUS

CLAIM OF PRIORITY

The present application claims priority from Japanese patent application JP 2020-090612 filed on May 25, 2020, the content of which is hereby incorporated by reference into this application.

BACKGROUND OF THE INVENTION

1. Field of the Invention

The present invention relates to a storage apparatus in which a plurality of storage controllers communicate with each other through a switch.

2. Description of the Related Art

A storage apparatus having a cluster configuration in which a plurality of storage nodes are collected can implement a high data access performance by parallel access and implement high availability by redundancy of data by causing the storage nodes to operate in parallel. For example, U.S. patent Ser. No. 10/459,791 discloses that a plurality of storage nodes are connected to each other through a network to configure a large-scale storage apparatus. In the following description and the drawings, an internal network of a storage apparatus in which a plurality of storage nodes are connected to each other is referred to as a storage internal network. Further, a storage node is sometimes referred to simply as a node.

Generally, a storage node includes a storage controller and a randomly accessible nonvolatile recording medium. For example, the recording medium is a drive box including a great number of nonvolatile semiconductor memory drives or hard disk drives. The storage controller includes a frontend interface for connecting with an upper apparatus such as a host system, a backend interface for connecting with the drive box, and a cache memory that temporarily stores user data to be read out from or written into the drive box by the upper apparatus. Further, the storage controller includes a control memory that stores control data to be handled in the storage controller and a processor that controls data transfer of user data and control data. In a storage apparatus in which a plurality of storage nodes are connected to each other, the plurality of storage nodes perform transmission and reception of user data and control data therebetween through a storage internal network.

Further, the Ethernet is known as a standard of a network suitable for connection between computer nodes such as storage nodes. In a storage apparatus in which the Ethernet is applied to the storage internal network, a plurality of storage nodes are connected to each other by an Ethernet switch.

Generally, the Ethernet switch includes a plurality of data ports for connecting a plurality of storage nodes to each other and a management port for connecting to a management network. Further, the Ethernet switch generally includes an application specific integrated circuit that implements data transfer between data ports. The application specific integrated circuit is hereinafter referred to as a switch ASIC.

Further, the Ethernet switch includes a central processing unit (CPU) for controlling the switch ASIC, which is hereinafter referred to as a switch CPU, and a memory for storing a program to be executed and data to be referred to by the switch CPU. The memory is hereinafter referred to as a switch memory. The Ethernet switch further includes a management interface that includes a management port and is connected to the switch CPU.

A storage controller monitors a port status of an Ethernet switch in order to detect a failure of a different storage controller that is a transfer destination of data. For example, in a case where a failure occurs in a power supply of the storage controller, a port of the Ethernet switch for connecting the storage controller goes down. Accordingly, a normal storage controller reads out a port status of the Ethernet switch, thereby can detect a power supply failure of a different storage controller or the like.

As a conventional technology for reading out a port status of an Ethernet switch, simple network management protocol (SNMP) and Telemetry are available. In the technologies just described, generally a management server reads out a status of the data port from a management port of the Ethernet switch through a management network. A period of time of one second or more is required for the readout.

In a case where a host system and a storage are connected to each other through the Ethernet, generally an alternate pass is prepared between the host system and the storage. Further, a lost packet is sent again by a mechanism of an upper transport layer of the Ethernet. Accordingly, in a case where a port of the Ethernet switch goes down due to a failure of the storage controller, even if a period of time of one second or more is required for port status readout by the SNMP or the Telemetry, data transfer between the host system and the storage can be continued. Consequently, in a conventional way of use of the Ethernet switch, there is no problem even if a period of time of one second or more is required for port status readout.

In order to implement a function of a storage apparatus, a processor of a storage controller executes a storage controlling program. The storage controlling program operates, for example, on up to hundreds of storage controller internal processor cores in the maximum. There possibly is a case in which the storage controlling program operating on a large number of cores reads out the port status of the switch at the same time. If the readout time is long, then processor waiting time in the storage controlling program becomes long and causes performance degradation of the storage apparatus.

It is necessary, for the switch applied to an inter-controller network in the inside of the storage, to be able to read out the port status in a short time period of, for example, an approximately one millisecond even in a case where a great number of cores access the switch. However, according to the conventional technology, a period of time of one second or more is required for port status readout as described above. Further, since a great number of switches are managed per one management server, it is not taken into consideration that readout requests of the port status from a great number of clients, in this case, management servers, are processed simultaneously by the switch.

It is an object of an embodiment of the present invention to provide a port status readout method of a switch in which a requirement for a storage internal network is satisfied and a storage apparatus for which the readout method is used.

SUMMARY OF THE INVENTION

An apparatus according to an embodiment of the present invention includes a switch and a plurality of storage controllers that communicate with each other through the switch. The switch includes a switch processor, a plurality of data ports, a switch integrated circuit that performs data transfer between the data ports, a memory, and a management interface. One of the plurality of data ports and a management port of the management interface are connected to each other. The switch processor stores a status of the plurality of data ports acquired from the switch integrated circuit into the memory. The plurality of storage controllers access the management interface through the plurality of data ports and the management port to receive the statuses of the plurality of data ports stored in the memory from the management interface.

The storage controller connected to the switch can read out a port status of the switch in a short period of time.

BRIEF DESCRIPTION OF THE DRAWINGS

FIG. 9 is a view illustrating a port management table in the embodiment 1;

FIG. 10 is a view illustrating correspondence among a data classification, a data transfer priority degree and a traffic class in the embodiment 1;

FIG. 15 is a view illustrating a port management table in the embodiment 4;

FIG. 16 is a view illustrating the port management table in the embodiment 4;

FIG. 17 is a view illustrating the port management table in the embodiment 4;

FIG. 18 is a view illustrating the port management table in the embodiment 4;

DESCRIPTION OF THE PREFERRED EMBODIMENTS

Figure 1:
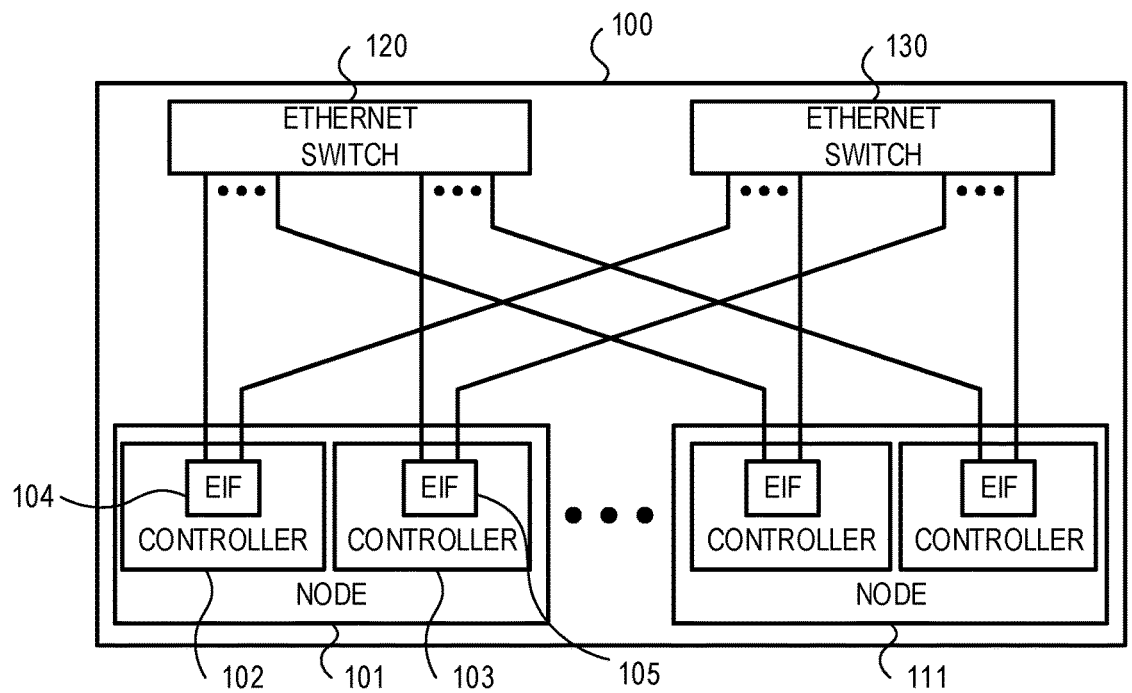
FIG. 1 is a view illustrating a storage apparatus of an embodiment 1.

In the following, several embodiments of the present invention are described with reference to the drawings. It is to be noted that constituent elements to which like reference characters are applied are substantially same through all of the embodiments. Further, a process is described sometimes using "program" as the subject. The program is executed by a processor such as, for example, a central processing unit (CPU) and performs predetermined processes. It is to be noted that, since the processing executed by the processor is performed suitably using a storage resource such as a memory and a communication interface device such as a communication port, the subject of the processing may be the processor. The processor may include not only a CPU but also hardware for exclusive use.

Embodiment 1

A storage apparatus according to an embodiment 1 is described with reference to FIGS. 1 to 11. FIG. 1 is a view illustrating a hardware configuration of the storage apparatus in the embodiment 1. The storage apparatus 100 in the embodiment 1 includes a plurality of storage nodes including storage nodes 101 and 111 connected to each other by an internal network. Although two storage nodes are depicted in FIG. 1, an optional number of storage nodes are connected to the internal network. In the present specification, the internal network is referred to as a storage internal network.

In the storage apparatus 100 according to the embodiment 1, a network constructed by switches and links, for example, of the Ethernet (registered trademark) standard is used as the storage internal network. The storage nodes 101 and 111 are connected to each other through Ethernet switches 120 and 130. It is to be noted that the number of Ethernet switches is determined optionally and switches and links of a protocol different from the Ethernet may be used instead.

The storage node 101 has two storage controllers 102 and 103 in the inside thereof. The storage controller 102 includes an edge interface (EIF) 104 for connecting to the Ethernet switches 120 and 130. Similarly, the storage controller 103 includes an edge interface (EIF) 105 for connecting to the Ethernet switches 120 and 130. The storage node 111 has a similar configuration to that of the storage node 101. The number of storage controllers in the storage node is determined optionally, and different storage controllers may have different configurations from each other.

Figure 2:
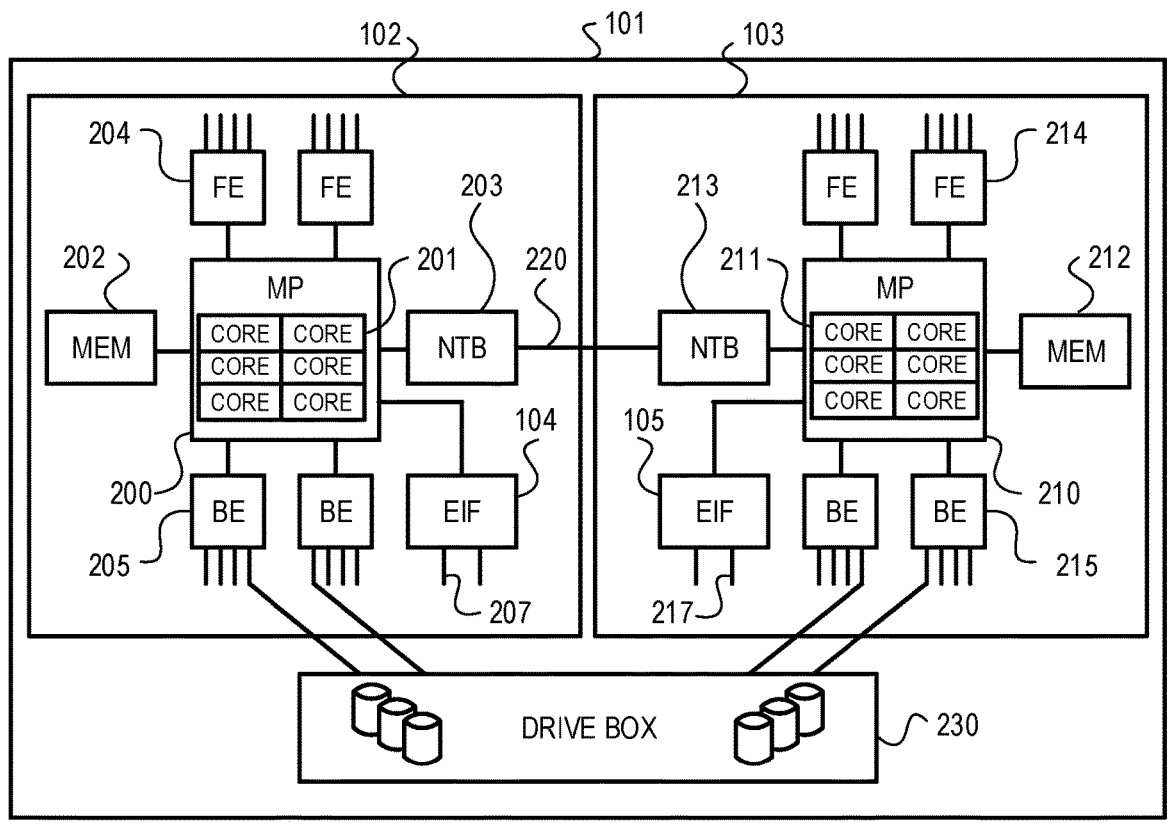
FIG. 2 is a view illustrating a storage node.

FIG. 2 is a view illustrating a hardware configuration of a storage node in the embodiment 1. The storage node 101 includes the storage controllers 102 and 103 and a drive box 230 that includes a plurality of hard disk drives (HDDs) or a plurality of solid-state drives (SSDs).

The storage controller 102 includes a processor (MP) 200, a memory 202, a frontend interface (FE) 204 and a backend interface (BE) 205. Similarly, the storage controller 103 includes a processor (MP) 210, a memory 212, a frontend interface (FE) 214 and a backend interface (BE) 215. The processors 200 and 210 include a plurality of processor cores 201 and 211, respectively.

A host system not depicted that accesses the storage apparatus 100 is connected to the storage apparatus 100 through the frontend interfaces 204 and 214. The host system and the frontend interfaces 204 and 214 are connected to each other by transmission lines such as a Fibre Channel cable or an Ethernet cable.

Alternatively, a different configuration may be applied in which the host system and the frontend interfaces 204 and 214 are connected through a storage area network configured from a plurality of transmission lines and a plurality of switches. The frontend interfaces 204 and 214 perform conversion between a data transfer protocol between the host system and the storage node 101 and a data transfer protocol in the storage controllers 102 and 103.

The drive box 230 is connected to the storage controllers 102 and 103 through the backend interfaces 205 and 215, respectively. The backend interfaces 205 and 215 perform conversion between a data transfer protocol between the storage controllers 102 and 103 and a data transfer protocol between the storage controllers 102 and 103 and the drive box 230. It is to be noted that, where a drive in the drive box is an NVMe SSD of PCI Express (PCIe) connection, each of the backend interfaces 205 and 215 is a PCIe switch that does not perform protocol conversion.

The processors 200 and 210 control data transfer between the host system connected thereto through the frontend interfaces 204 and 214 and the drive box 230 connected thereto through the backend interface 205 and 215, respectively. Further, the processors 200 and 210 control data transfer between the storage nodes.

The memories 202 and 212 are main memories of the processor 200 and 210, respectively, and store programs such as a storage controlling program or the like to be executed by the processor 200 and 210, and management tables and so forth to be referred to by the processors 200 and 210. Further, the memories 202 and 212 are used also as cache memories of the storage controllers 102 and 103, respectively.

Further, the storage controllers 102 and 103 include non-transparent bridges (NTBs) 203 and 213 connected to the processors 200 and 210 by the PCI Express, respectively, and edge interfaces (EIFs) 104 and 105.

The NTB 203 and the NTB 213 are connected to each other by a non-transparent link 220. The processors 200 and 210 can communicate with each other through the non-transparent link 220. Consequently, the storage node 101 configures a dual controller from the two controllers 102 and 103.

The edge interfaces 104 and 105 individually include one or more physical ports for connecting to links of the Ethernet. In the following description, each physical port is referred to as an Ethernet port. In the storage apparatus 100 according to the present embodiment, the edge interface 104 includes at least an Ethernet port 207, and the edge interface 105 includes at least an Ethernet port 217. The processors 200 and 210 are connected to the Ethernet switches 120 and 130 of FIG. 1 through the Ethernet ports 207 and 217, respectively. As a result, storage controllers belonging to storage nodes different from each other can communicate with each other.

Figure 3:
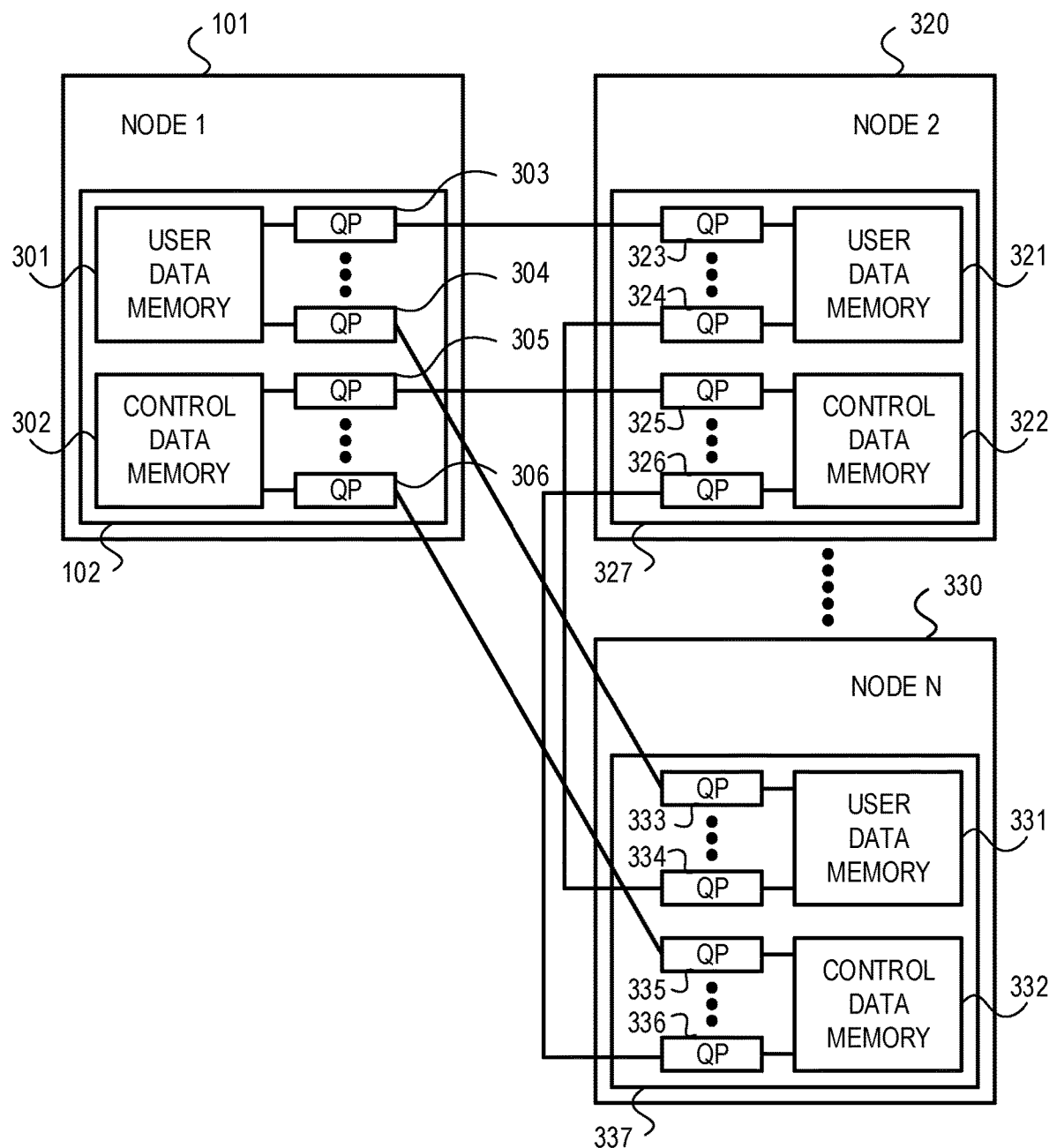
FIG. 3 is a view illustrating logical connection between storage controllers.

FIG. 3 is a view illustrating logical connection by an Ethernet network between storage controllers in the embodiment 1.

In the storage apparatus 100 of the present embodiment, a RoCE (RDMA over converged Ethernet) is used for data transfer between the storage controllers. The RoCE is a protocol that makes transfer by the RDMA on the Ethernet possible. The edge interfaces 104 and 105 for connecting the storage controllers to each other can perform RDMA data transfer by the RoCE.

The memories such as the memory 202 and memory 212 of FIG. 2 in the storage controllers individually include a user data memory region into which user data received from the host system is placed and a control memory region into which control data in the storage apparatus is placed. A cache memory of the storage node or a buffer region to be used by the frontend interface or the backend interface is allocated to the user data memory region.

In FIG. 3, the storage controller 102 in the storage node 1 (101) includes a user data memory region 301 and a control data memory region 302. Similarly, a storage controller 327 in the storage node 2 (320) includes a user data memory region 321 and a control data memory region 322. A storage controller 337 in the storage node n (330) includes a user data memory region 331 and a control data memory region 332.

In the RoCE, when a program that runs on the processor in each storage controller performs communication, a queue pair (QP) that is a logical communication port or logical port is used. In a reliable connection (RC) service of the RoCE, the QP is required for each storage controller that is a communication partner and each process of a program that operates the QP. Further, in a case where transfer of user data and control data are performed in priority degrees of data transfer different from each other, the QP is required for each data transfer memory region (user data memory region and control memory region).

Accordingly, each storage controller includes an individual QP, for example, at least for each storage controller connected to each memory region. For example, the storage controller 102 has a QP 303 for transferring data of the user data memory region 301 to the user data memory region 321 of the storage controller 327. Further, the storage controller 102 has a QP 304 for transferring data of the user data memory region 301 to the user data memory region 331 of the storage controller 337.

Further, the storage controller 102 has a QP 305 for transferring data of the control data memory region 302 to the control data memory region 322 of the storage controller 327. Furthermore, the storage controller 102 has a QP 306 for transferring data of the control data memory region 302 to the control data memory region 332 of the storage controller 337.

Similarly, the storage controller 327 has a QP 323 for transferring data of the user data memory region 321 to the user data memory region 301 of the storage controller 102. Further, the storage controller 327 has a QP 324 for transferring data of the user data memory region 321 to the user data memory region 331 of the storage controller 337.

Further, the storage controller 327 has a QP 325 for transferring data of the control data memory region 322 to the control data memory region 302 of the storage controller 102. Furthermore, the storage controller 327 has a QP 326 for transferring data of the control data memory region 322 to the control data memory region 332 of the storage controller 337.

Similarly, the storage controller 337 has a QP 333 for transferring data of the user data memory region 331 to the user data memory region 301 of the storage controller 102. Further, the storage controller 337 has a QP 334 for transferring data of the user data memory region 331 to the user data memory region 321 of the storage controller 327.

Furthermore, the storage controller 337 has a QP 335 for transferring data of the control data memory region 332 to the control data memory region 302 of the storage controller 102. Further, the storage controller 337 has a QP 336 for transferring data of the control data memory region 332 to the control data memory region 322 of the storage controller 327. It is to be noted that bidirectional communication is possible between two QPs.

Figure 4:
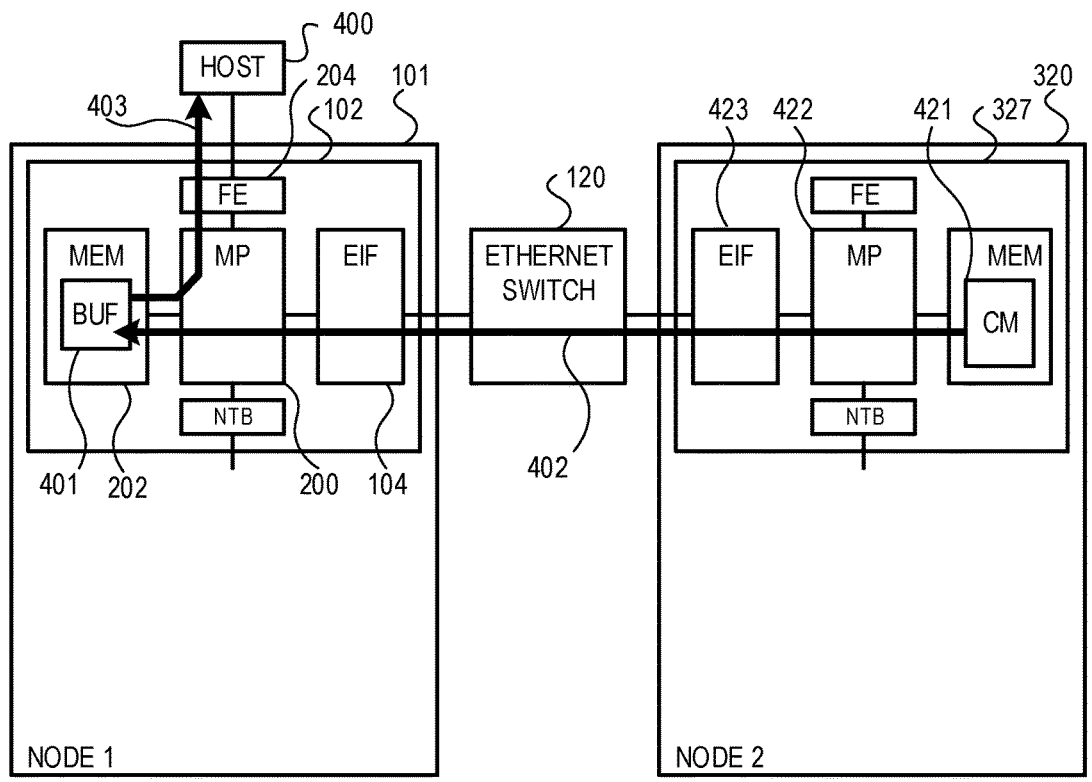
FIG. 4 is a view illustrating Read operation of the storage apparatus.

FIG. 4 is a view illustrating operation of the storage apparatus 100 of the embodiment 1 in a case where it receives a Read request from the storage node 1 (101). The host system 400 is connected to the front end interface 204 of the storage controller 102 in the storage node 1 (101). It is assumed that the front end interface 204 receives a Read request from the host system 400. Further, it is assumed that data requested by the host system 400 is stored in the cache memory (CM) 421 of the storage controller 327 in the storage node 2 (320).

The processor 200 of the storage controller 102 transmits a readout request of data in the cache memory 421 from the edge interface 104 to the edge interface 423. In particular, by the data transfer controlling program executed by the processor 200, the processor 200 posts a data readout request such as an RDMA Read request to a QP for communication with the storage controller 327 among a plurality of QPs prepared in the storage controller 102. The posting signifies an operation for placing a request into a send queue of the QP, which is in the memory 202. Thus, the RDMA Read request is transmitted from the edge interface 104 to the edge interface 423.

The edge interface 423 receives this request and transfers readout data in the cache memory 421 to the buffer region 401 in the memory 202 along a route that includes the processor 422, edge interface 423, Ethernet switch 120, edge interface 104 and processor 200. Although the data passes the ports of the processors 422 and 200 during the transfer, the cores of them do not participate in the data transfer. This is similar also among transfer examples by the RDMA. The front end interface 204 transfers the readout data placed in the buffer region 401 to the host system 400 (403).

Alternatively, such control may be performed such that data in the cache memory 421 is transmitted from the storage controller 327 to the storage controller 102 using an RDMA Write request. In this case, the processor 200 first posts a request such as an RDMA Write request for transferring a message for requesting readout data transmission to the processor 422 to a QP for communication with the storage controller 327. The processor 422 receives the message and posts an RDMA Write request for transferring readout data to a QP for communication with the storage controller 102.

Figure 5:
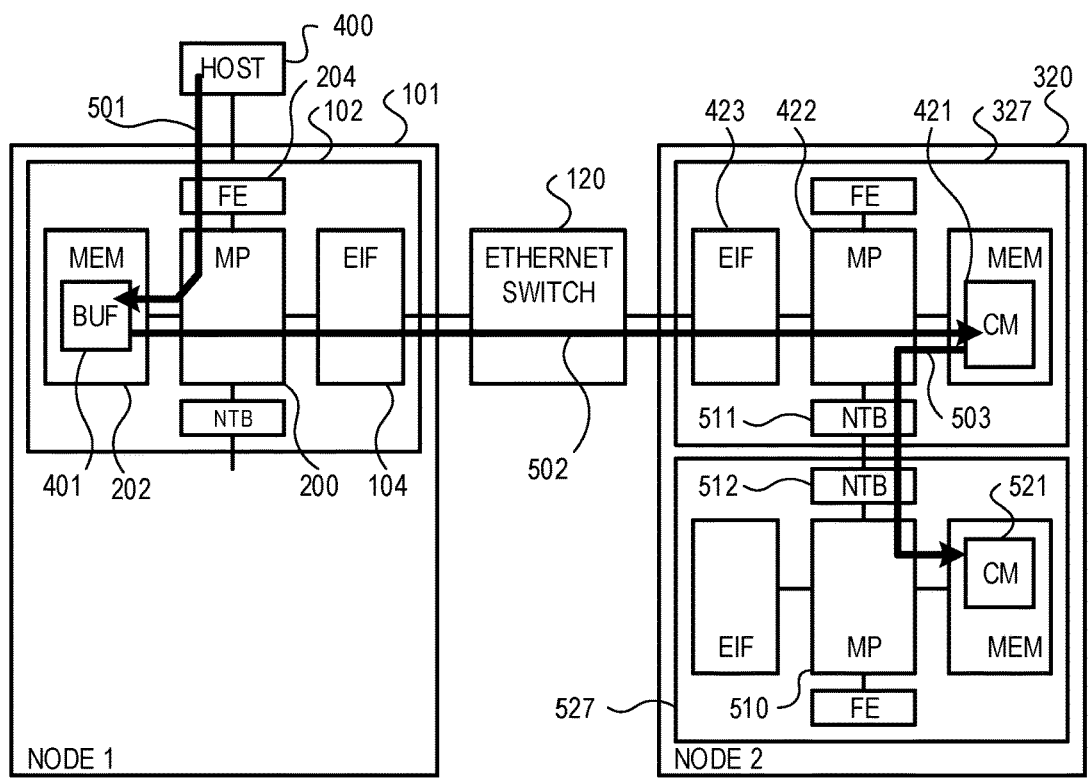
FIG. 5 is a view illustrating Write operation of the storage apparatus.

FIG. 5 is a view illustrating operation of the storage apparatus 100 of the embodiment 1 in a case where a Write request is received from the host system. Write data received from the host system 400 is first placed into the buffer region 401 in the memory 202 (501). It is assumed that the cache memory 421 in the storage controller 327 is designated as a write destination of the write data received from the host system 400 by the storage controlling program.

The processor 200 transfers the write data in the buffer region 401 to the cache memory 421 of the storage controller 327 through the Ethernet switch 120 and (a port of) the processor 422 using the RDMA data transfer function of the edge interfaces 104 and 423 (502).

Further, in order to make the write data redundant, the processor 422 transfers the write data to the cache memory 521 of the storage controller 527 through the NTB 511, NTB 512 and processor 510 (503). After writing into the two cache memories (421 and 521) in the storage node 2 (320) is completed, the front end interface 204 notifies the host system 400 of the completion of the writing.

Also in this case, similarly to the process in the case where a Read request is received from the host system, the processor 200 may post a request for data write such as an RDMA Write request to a QP for communication with the storage controller 327 from among a plurality of QPs prepared in the storage controller 102. This makes it possible for the edge interfaces 104 and 423 to perform RDMA data transfer therebetween.

Figure 6:
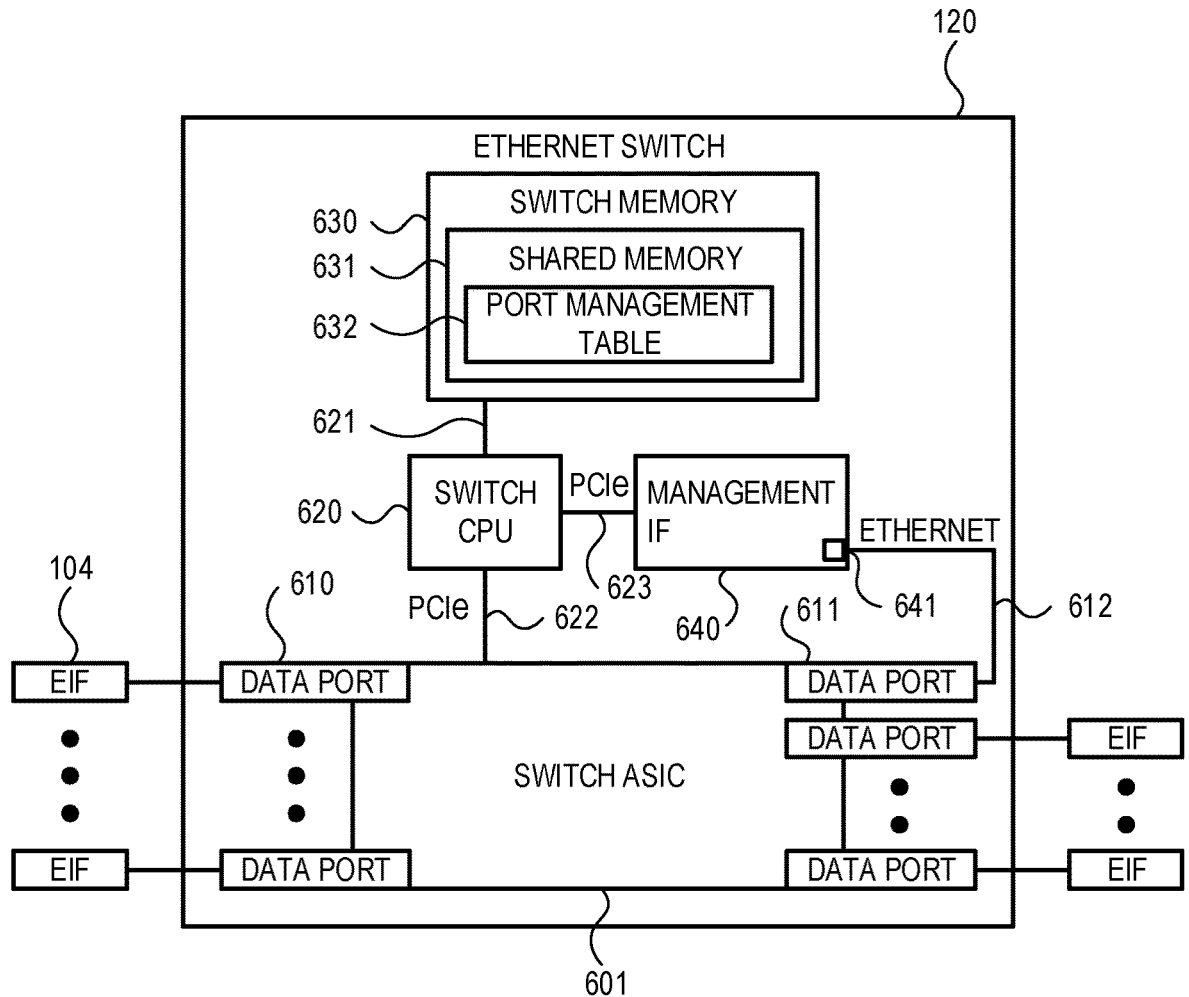
FIG. 6 is a view illustrating a configuration of an Ethernet switch.

FIG. 6 is a view illustrating an example of a configuration of the Ethernet switch. The Ethernet switch 120 includes data ports 610 connected one to one to the edge interfaces 104 in the storage controllers, a switch application specific integrated circuit (switch ASIC) 601 that implements data transfer between the predetermined data ports, and a switch central processing unit (switch CPU) 620 that sets and controls the switch ASIC 601. The switch ASIC and the switch CPU are an example of the switch integrated circuit and the switch processor, respectively.

The Ethernet switch 120 further includes a switch memory 630 for storing programs to be executed and data to be referred to by the switch CPU 620, and a management interface 640. The management interface 640 is provided as a network interface card or a field programmable gate array (FPGA) card for supporting, for example, the RDMA. Furthermore, the management interface 640 includes a management interface port 641 that is an Ethernet port.

The switch CPU 620 and the switch ASIC 601 are connected to each other by a PCI express (PCIe) 622. The switch CPU 620 and the management interface 640 are connected to each other by a PCI express (PCIe) 623. The switch CPU 620 and the switch memory 630 are connected to each other by a memory bus 621.

The management interface port 641 and a data port 611 are connected to each other by an Ethernet link 612 in the inside of a housing of the Ethernet switch. The Ethernet link 612 has a frequency band sufficient to read out the port management table from each storage controller. For example, even if the data port 611 has a frequency bandwidth of 100 Gbps, if the bandwidth of 1 Gbps to 10 Gbps is sufficient for reading out the port management table, then the Ethernet link 612 is a link of 10 Gbps or less and besides of a higher speed than the speed of the management network such as 1 Gbps.

Since the frequency bandwidth of the link for connecting the data port with the management port is smaller than the bandwidth of the link for connecting the storage controller with the data port, the necessity for the management interface port 641 and the Ethernet link 612 to be ready for a high speed such as 100 Gbps is eliminated, and the configuration of the Ethernet switch can be simplified.

The switch memory 630 includes a shared memory 631. The shared memory 631 is shared by the switch CPU 620 and the management interface 640 and is a region accessible from them. The shared memory 631 stores a port management table 632 therein. The switch CPU 620 reads out a status of the data ports 610 at present from the switch ASIC 601 and places the values of the statuses into the port management table 632 in the shared memory 631. In order that the process of the switch CPU 620 of placing the port statuses into the port management table 632 and the process of transmitting the port management table 632 from the management interface 640 to the storage controller share the port management table, the port management table 632 is placed in the shared memory 631.

The management interface 640 is capable of performing data transfer by RDMA. The management interface 640 can store data received from the management interface port 641 into the switch memory 630 and transmit the data in the switch memory 630 from the management interface port 641 without the participation of the core of the switch CPU 620. The shared memory 631 is registered as a memory region that is made a target of RDMA data transfer of the management interface 640, and the port management table 632 is included into the shared memory 631.

Since the management interface port 641 and the data port 611 are connected to each other by the Ethernet link 612, each storage controller can read out the port management table 632 by RDMA data transfer along a data path that includes the data ports 610 and the switch ASIC 601, that is, in-band. Also the Ethernet switch 130 is configured similarly to the Ethernet switch 120.

Figure 7:
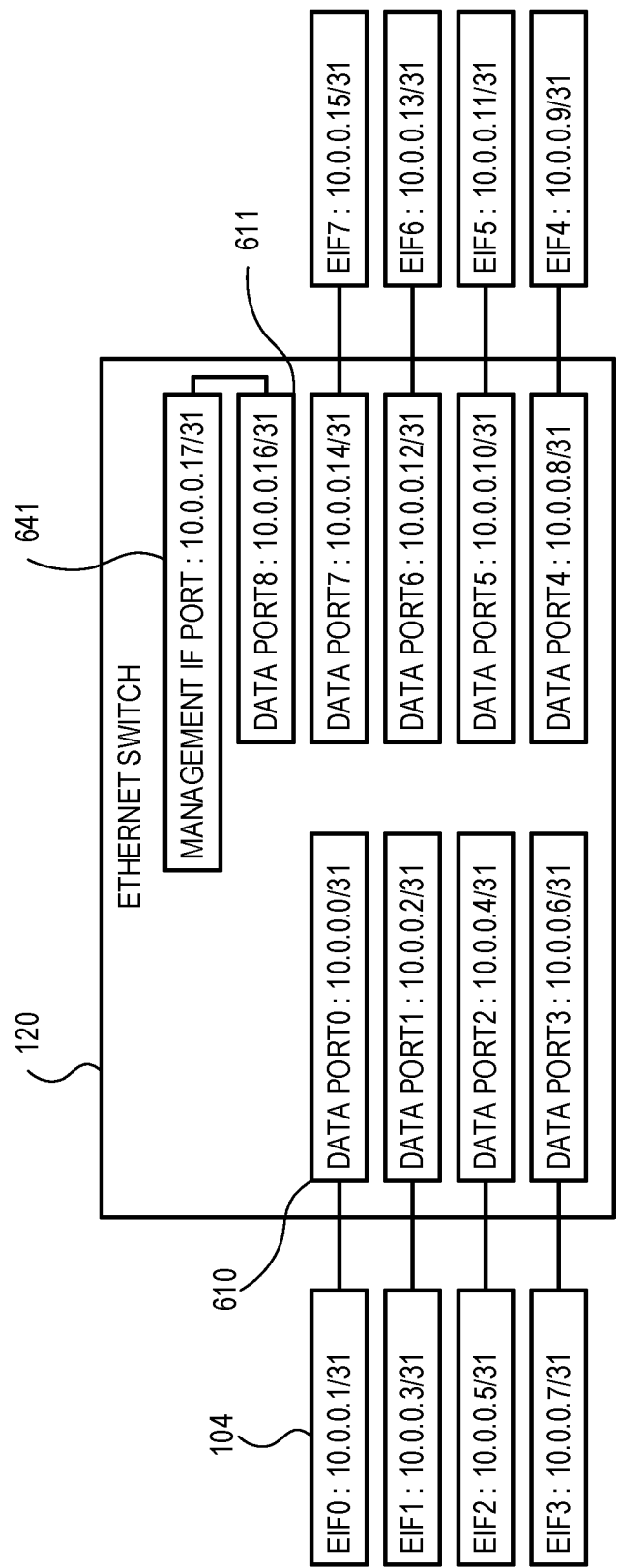
FIG. 7 is a view illustrating IP address setting in the embodiment 1.

FIG. 7 is a view illustrating Internet protocol (IP) address setting in the embodiment 1. In the storage apparatus 100 of the embodiment 1, the Ethernet switch 120 is set as a switch of the IP layer 3. To each data port of the Ethernet switch of the layer 3, an IP address is allocated. For example, to the data port i, the IP address of 10.0.0.2i is allocated. In the example of FIG. 7, i is an integer from 0 to 8. To a port of an edge interface connected to each data port, the address of 10.0.0.2i+1 is allocated. The net mask for the IP address of the data port and the edge interface port is 31.

In short, in the storage apparatus of the embodiment 1, the IP address number configuring a subnet is 2, and the subnet differs for each data port and for each edge interface port connected to the data port. For example, the IP address of the data port 610 is 10.0.0.0/31 and the IP address of the port of the edge interface 104 connected to the data port 610 is 10.0.0.1/31. The data port 611 is connected to the management interface port 641 in the inside of the Ethernet switch. The IP address of the data port 611 is 10.0.0.16/31 and the IP address of the management interface port 641 is 10.0.0.17/31.

Figure 8:
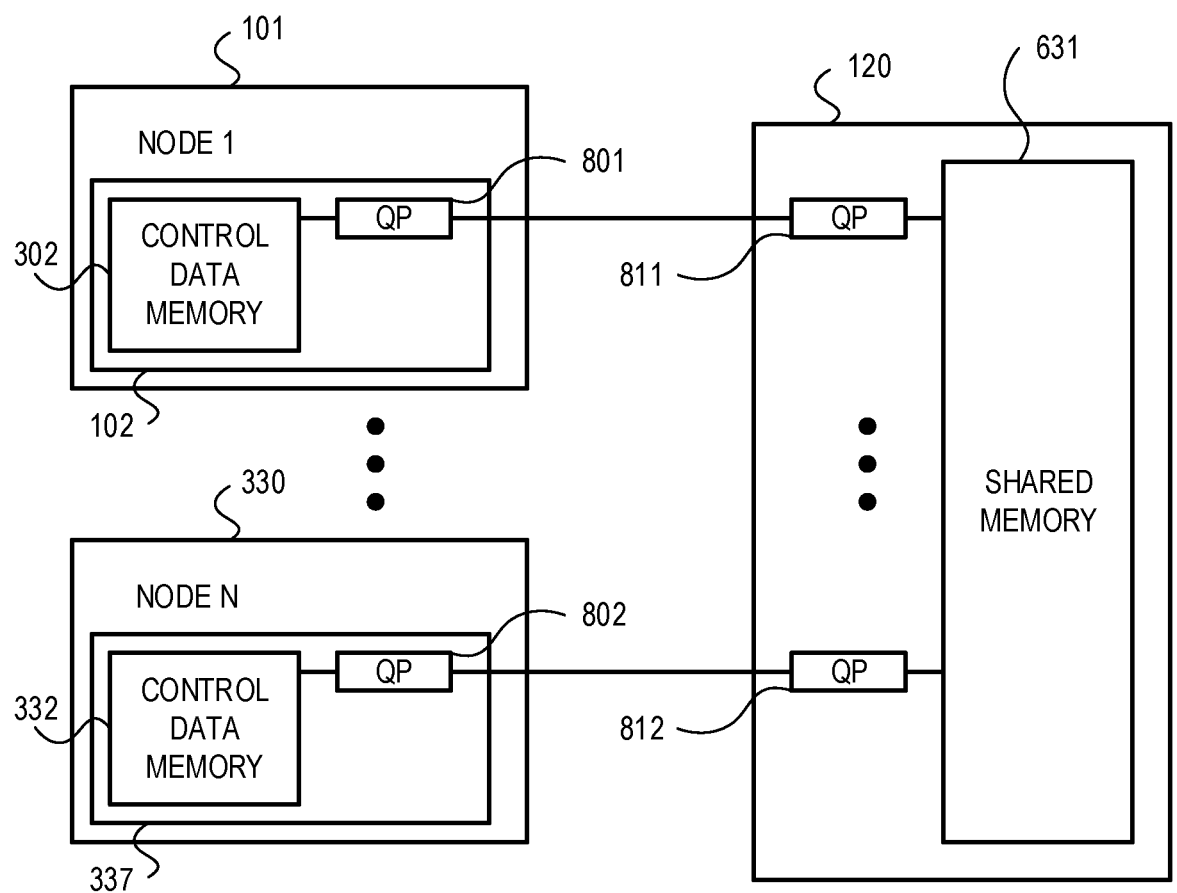
FIG. 8 is a view illustrating logical connection between the storage controller and the Ethernet switch.

FIG. 8 is a view illustrating logical connection between a storage controller and an Ethernet switch. In order to transfer data in the shared memory 631 of the Ethernet switch 120 to the control data memory region 302 of the storage controller 102 in the storage node 1 (101), the storage controller 102 has a QP 801 and the Ethernet switch 120 has a QP 811.

Similarly, in order to transfer data in the shared memory 631 of the Ethernet switch 120 to the control data memory region 332 of the storage controller 337 in the storage node n (330), the storage controller 337 has a QP 802 and the Ethernet switch 120 has a QP 812. In this manner, each storage controller has a QP for reading out a port management table from the Ethernet switch separately from the QPs (FIG. 3) for data transfer between the storage controllers belonging to different storage nodes.

FIG. 9 is a view illustrating the port management table in the embodiment 1. The port management table 632 includes identification information 901 for the data ports, an administration state 902 for the data ports, and an operation status 903 for the data ports. The administration state is a set value of each data port state indicated to the switch ASIC 601 by the switch CPU 620. The operation status is an actual status of each data port.

In a normal state, it is desirable that the administration state 902 and the operation status 903 coincide with each other. For example, if the administration state 902 is up (down), then also the operation status 903 is up (down). However, in such a case that a failure occurs in a storage controller of a connection destination, even if the administration state 902 is up, the operation status 903 possibly is down. "Up" indicates a state in which communication is possible, and "down" indicates a state in which communication is not possible.

Further, table update information 904 is included in the port management table 632. This information is information, for example, relating to time at which the switch CPU 620 has updated the port management table 632. The processor 200 in the storage controller 102 that reads out the port management table 632 from the Ethernet switch 120 can confirm whether the read out port management table is latest by referring to the this table update information 904 and comparing the table update information 904, for example, with the time at present.

FIG. 10 is a view illustrating correspondence among a data transfer use, a data transfer priority degree and a traffic class in the embodiment 1. The traffic class indicates a resource to be used for data transfer. By classifying data transfer resources among different uses of data transfer, it is possible, for example, to prevent congestion of user data transfer from having an influence on control data transfer.

A data transfer priority degree management table 1000 indicates correspondence among a use 1001 of data transfer, an allocated data transfer priority degree 1002 and a traffic class 1003 associated with the data transfer priority degree. As the value of the data transfer priority degree 1002 increases, the priority degree increases.

The storage apparatus 100 of the embodiment 1 sets the data transfer priority degree 0 to a QP for performing user data transfer 1011 and allocates a traffic class 0. Further, the storage apparatus 100 sets the data transfer priority degree 1 to a QP for performing control data transfer 1012 and allocates a traffic class 1. Furthermore, the storage apparatus 100 sets the data transfer priority degree 2 to a QP for performing port management table readout 1013 from the Ethernet switch and allocates a traffic class 2.

As the data transfer priority degree increases, the priority degree of data transfer increases. Since a traffic class is allocated to each use of data transfer, even if congestion on an Ethernet link by user data transfer occurs, data for port management table readout from the Ethernet switch is transferred in priority.

In a case where the number of traffic classes that can be allocated to the Ethernet links is small, one traffic class is shared, for example, by control data and port management table readout from the Ethernet switch and the data transfer priority degree of port management table readout is set higher at least to user data transfer. Further, at least to user data transfer and port management table readout from the Ethernet switch, different traffic classes are allocated. This makes it possible to suppress delay of readout of the port management table.

Figure 11:
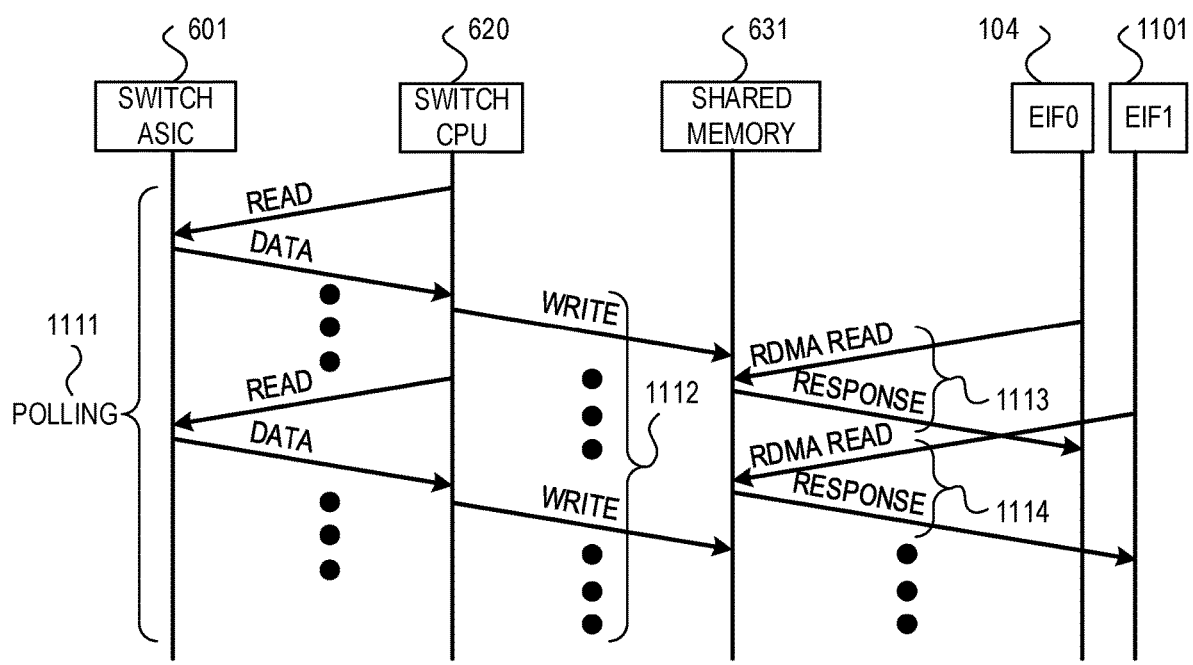
FIG. 11 is a view illustrating a sequence when the storage controller reads out the port management table from the Ethernet switch.

FIG. 11 is a view illustrating a sequence when the processor in a storage controller reads out the port management table 632 in the shared memory 631 from the Ethernet switch 120 through an edge interface.

The switch CPU 620 repeatedly reads out a status of the data ports from the switch ASIC 601 (1111). The switch CPU 620 repeatedly writes the read out statuses of the data ports into the port management table 632 in the shared memory 631 (1112).

In order to allow the storage controller to read out the port management table 632, it transmits an RDMA Read request from the edge interface 104 to the management interface 640. The management interface 640 receives the RDMA Read request and sends back the port management table 632 to the edge interface 104 (1113). Similarly, if the management interface 640 receives an RDMA Read request from the edge interface 1101 of a different storage controller, then it sends back the port management table 632 to the edge interface 1101 (1114).

As described above, in the storage apparatus according to the embodiment 1, the storage controller can read out a port status in a short period of time from the Ethernet switch by using an inter-controller network in the inside of a storage whose speed is higher than that of a general management network.

The period of time required for the switch CPU 620 to read out a status of data ports from the switch ASIC 601 and place the status values into the port management table 632 is at most approximately 100 microseconds. Meanwhile, the RDMA Read data transfer time period between each storage controller and the shared memory 631 is at most 10 microseconds. Accordingly, according to the storage apparatus of the embodiment 1, a port status of the Ethernet switch can be read out from each storage controller in a period of time equal to or shorter than 1 millisecond.

Further, readout of the port management table by a storage controller using an RDMA command makes it possible to suppress the load due to the readout of the port management table from being applied to the switch CPU 620. Further, the port management table can be read out in short time even from a great number of storage controllers. It is to be noted that the storage controller and the management interface may not support RDMA transfer, and instead, the storage controller may acquire a current status of the data ports by some other method like interrupt to the switch CPU 620.

Further, since a storage controller can access the management interface and the switch CPU of the Ethernet switch in-band, a management network for managing a storage internal network can be omitted.

Embodiment 2

A storage apparatus according to an embodiment 2 is described with reference to FIG. 12. The configuration of the storage apparatus of the embodiment 2 other than the Ethernet switch is similar to that of the embodiment 1, and therefore, description of the configuration is omitted herein.

Figure 12:
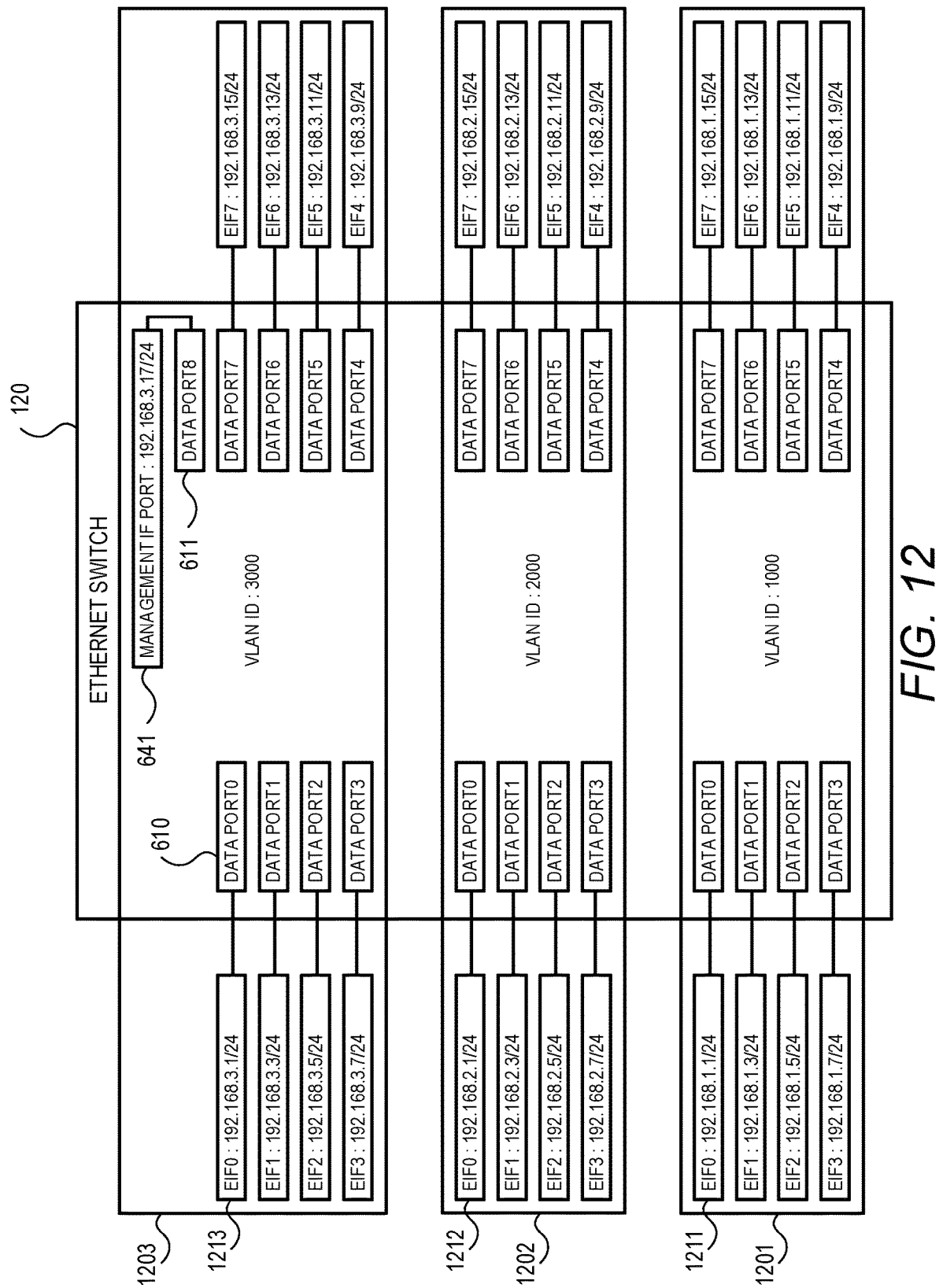
FIG. 12 is a view illustrating IP address setting in an embodiment 2.

FIG. 12 is a view illustrating IP address setting in the embodiment 2. In the storage apparatus of the embodiment 2, the Ethernet switch 120 is set as a switch of the IP layer 2. Further, three virtual local area networks (VLANs) 1201, 1202 and 1203 are provided in the storage internal network. The VLAN 1201 is a network used for user data transfer and has a VLAN ID of 1000. The VLAN 1202 is a network used for control data transfer and has a VLAN ID of 2000. The VLAN 1203 is a network used by the storage controller to read out a port management table from the Ethernet switch and has a VLAN ID of 3000.

To the Ethernet port of each edge interface, three IP addresses corresponding to the three VLANs are allocated. For example, to the Ethernet port of the edge interface (EIF0) connected to the data port 610 of the Ethernet switch 120, an IP address 192.168.1.1/24 is allocated corresponding to the VLAN 1201 (1211).

Meanwhile, to the Ethernet port of the edge interface (EIF0), an IP address 192.168.2.1/24 is allocated corresponding to the VLAN 1202 (1212). Furthermore, to the Ethernet port of the edge interface (EIF0), an IP address 192.168.3.1/24 is allocated corresponding to the VLAN 1203.

Here, the network mask for the IP address is 24. Different from the case of FIG. 7, the data port of the Ethernet switch of the layer 2 has no IP address allocated thereto. The IP address of the management interface port 641 connected to the data port 611 in the inside of the Ethernet switch 120 corresponds to the VLAN 1203 and is 192.168.3.17/24. Each storage controller can access the management interface port 641 through the VLAN 1203 and can read out the port management table from the Ethernet switch 120.

In the storage apparatus of the embodiment 2, the VLAN 1203 that can access the switch CPU of the Ethernet switch 120 and the other VLANs 1201 and 1202 for data transfer are separated from each other. This setting can prevent traffic other than port management table readout from flowing into the switch CPU to place the switch CPU into an overload state. If the switch CPU is placed into an overload state, then there is the possibility that this may cause a trouble in action of the Ethernet switch. It is to be noted that, in a different example, the VLAN for user data transfer and the VLAN for control data transfer may be same as each other.

Embodiment 3

A storage apparatus according to an embodiment 3 is described with reference to FIG. 13. The configuration of the storage apparatus of the embodiment 3 other than the Ethernet switch is similar to that of the storage apparatus of the embodiment 1. Therefore, overlapping description of the configuration is limited.

Figure 13:
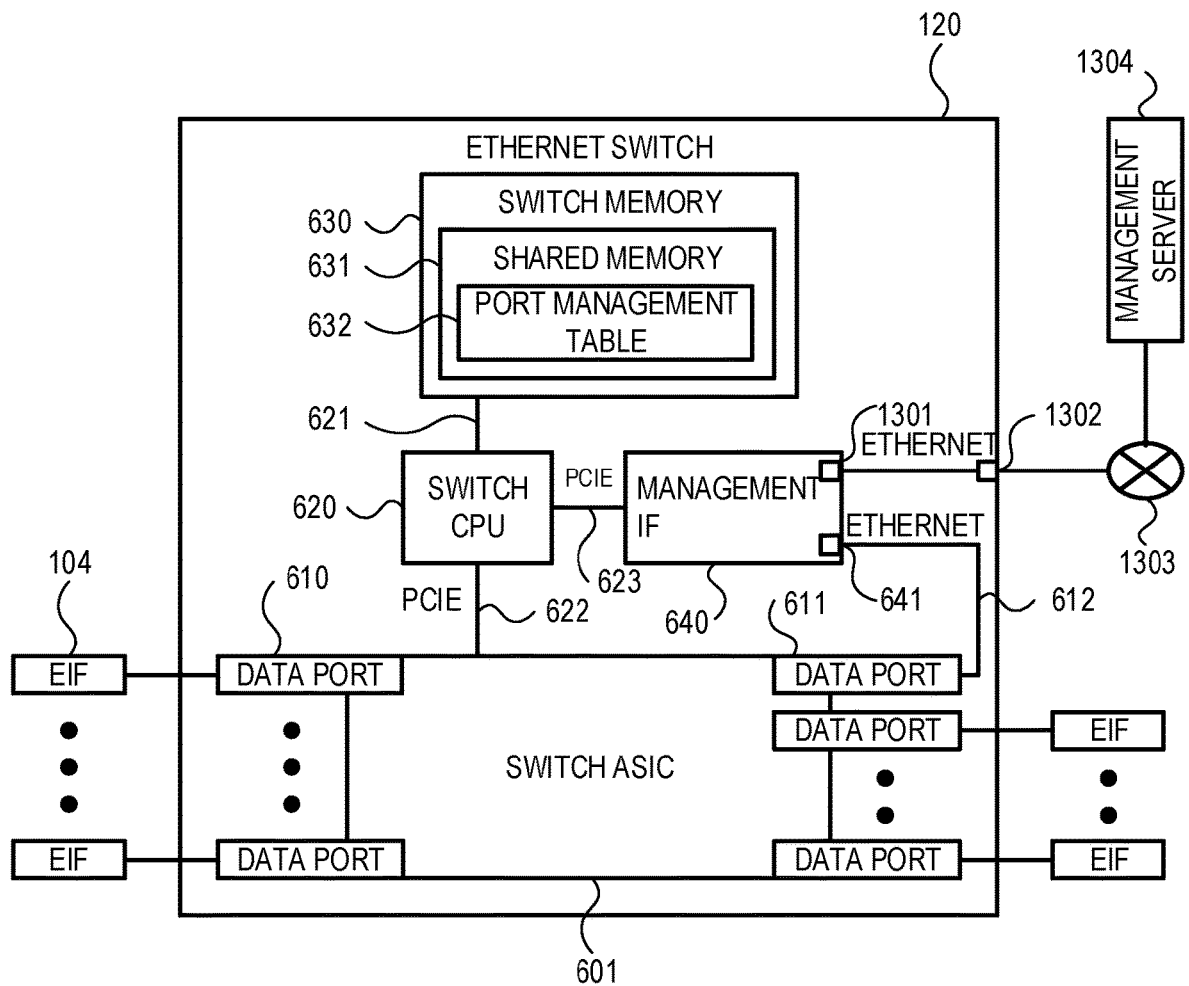
FIG. 13 is a view illustrating an Ethernet switch in an embodiment 3.

FIG. 13 is a view illustrating an Ethernet switch that includes, in addition to the components of the Ethernet switch of FIG. 6, an Ethernet port for management network connection. In the Ethernet switch 120 of FIG. 13, the management interface 640 includes an Ethernet port 1301 in addition to the management interface port 641. The Ethernet port 1301 is connected to a management port 1302 of the Ethernet switch 120. Further, the management port 1302 is connected to a management network 1303.

A management server 1304 can access the management port 1302 of the Ethernet switch 120 through the management network 1303. The management server 1304 can use standard means such as SNMP or Telemetry to perform transmission and reception of management information on the Ethernet switch 120 thereby to manage the Ethernet switch 120. In other words, since only it is necessary that SNMP or Telemetry can be used, the management interface 640 need not perform RDMA data transfer through the Ethernet port 1301.

Since the configuration of the other part of the Ethernet switch 120 of FIG. 13 is similar to that of the Ethernet switch 120 of FIG. 6, description of the configuration is omitted.

According to the storage apparatus of the embodiment, 3, even in an environment in which network management of the conventional type through a management network is essentially required, the storage internal network including the Ethernet switch can be managed. In addition, also management by in-band access to the Ethernet switch from a storage control, which is similar as in the embodiment 1, is possible.

Embodiment 4

A storage apparatus according to an embodiment 4 is described with reference to FIGS. 14 to 18. Since the configuration of the storage apparatus of the embodiment 4 other than the Ethernet switch is similar to that of the storage apparatus of the embodiment 1, description of the configuration is omitted.

The storage apparatus of the embodiment 4 is characterized in that the Ethernet switch that receives an instruction from a storage controller changes the state of a data port. This is effective in such a case that a data port to which a storage controller that suffers from a failure is connected is powered down in accordance with an instruction from a different storage controller that is normal.

Figure 14:
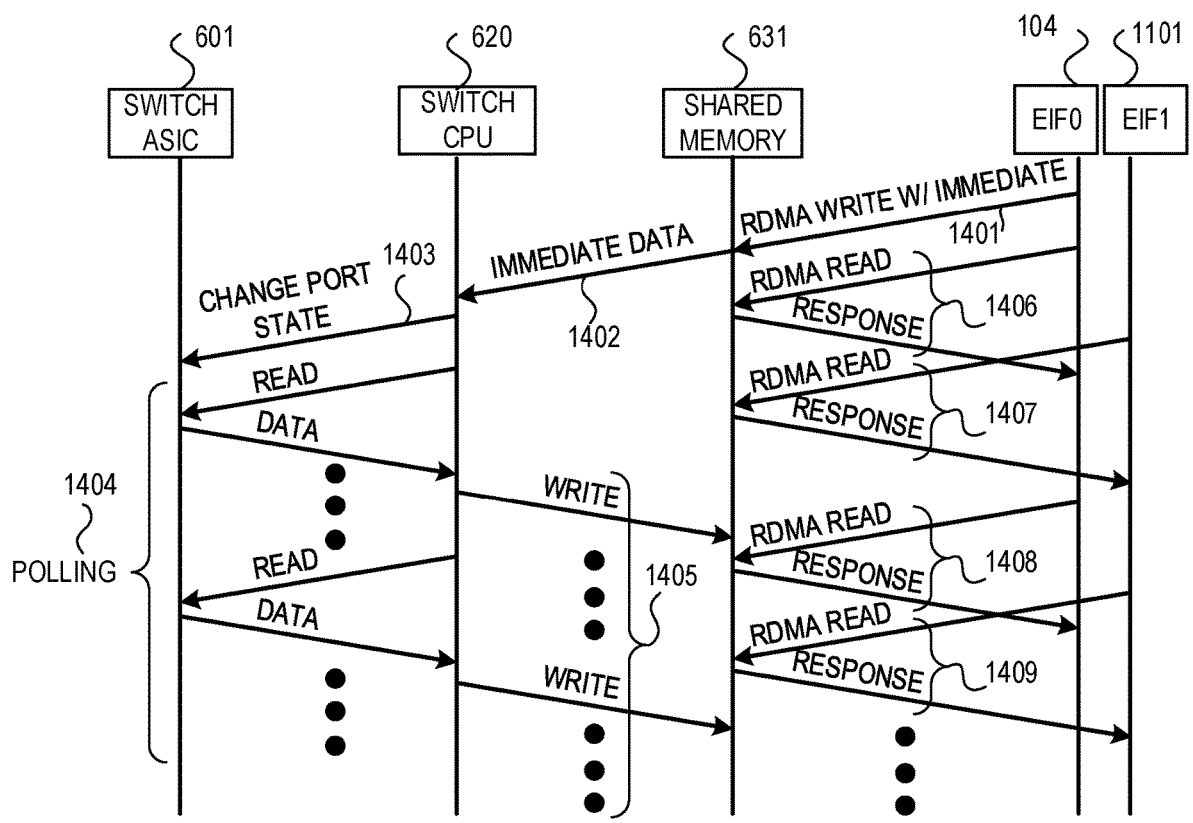
FIG. 14 is a view illustrating a sequence in a case where an instruction for causing a data port of an Ethernet switch to go down is issued from a storage controller in an embodiment 4.

FIG. 14 is a view illustrating a sequence when the processor in a storage controller issues a state changing instruction for a data port and reads out the port management table in the shared memory 631 from the Ethernet switch 120 through an edge interface.

In the storage apparatus of the embodiment 4, the storage controller updates the port management table in the Ethernet switch using an RDMA-Write-with-Immediate request and instructs the switch CPU to change the state of the data port.

The RDMA-Write-with-Immediate request is a request capable of transmitting Immediate Data from a QP of a transmission source to a QP of a transmission destination in addition to action of RDMA write. The switch CPU 620 can extract Immediate Data from the completion queue connected to the QP that receives the RDMA-Write-with-Immediate request.

The storage controller transmits an RDMA-Write-with-Immediate request from the edge interface 104 (1401). The management interface 640 receives the request and updates the port management table in the shared memory 631.

Then, the switch CPU 620 retrieves completion entries from the completion queue and receives Immediate Data included in the retrieved completion entries (1402). This Immediate Data includes an instruction for causing a particular data port to go down.

The switch CPU 620 receives the Immediate Data and instructs the switch ASIC 601 to change the port state (1403). The switch CPU 620 repeatedly reads out the status of the data ports from the switch ASIC 601 (1404). The switch CPU 620 writes the read out statuses of the data ports into the port management table in the shared memory 631 (1405).

In order for the storage controller to read out the port management table, it transmits an RDMA Read request from the edge interface 104 to the management interface 640. The management interface 640 receives the RDMA Read request and sends back the port management table to the edge interface 104 (1406 and 1408). Similarly, the management interface 640 receiving an RDMA Read request from the edge interface 1101 of a different storage controller sends back the port management table to the edge interface 1101 (1407 and 1409).

Now, a change of data contents placed in the port management table in the storage apparatus of the embodiment 4 in accordance with the sequence of FIG. 14 is described with reference to FIGS. 15 to 18.

FIG. 15 is a view illustrating a port management table 1500 in the storage apparatus of the embodiment 4. The port management table 1500 is stored in the shared memory 631 of the Ethernet switch 120 similarly to the port management table 632 of the embodiment 1. The port management table 1500 includes identification information 1501 on a data port, an acceptance state 1502 indicative of a state after change in a case where an instruction for change is received from the storage controller, an administration state 1503 of each data port and an operation status 1504 of each data port. Further, the port management table 1500 includes table update information 1505 similar to the table update information 904 of the embodiment 1.

The port management table 1500 of FIG. 15 indicates that, in the data ports whose Port ID is "0" all of the acceptance state 1502, administration state 1503 and operation status 1504 are up.

FIG. 16 depicts the port management table 1500 immediately after an instruction to cause the data port whose Port ID is "0" to go down is received from the switch CPU 620 that receives Immediate Data. As a result of the content of the port management table 1500 being directly rewritten by the RDMA Write from the storage controller without passing through the switch CPU 620, the acceptance state 1502 is changed to down.

FIG. 17 depicts the port management table 1500 immediately after the switch CPU 620 receiving Immediate Data issues an instruction to the switch ASIC 601 to cause the data port whose Port ID is "0" to go down. The acceptance state 1502 and the administration state 1503 are changed to down.

FIG. 18 depicts the port management table 1500 after the state change of the data ports whose Port ID is "0" by the switch ASIC 601 is completed. The acceptance state 1502, administration state 1503 and operation status are changed to down.

In a case where the switch ASIC 601 issues status change of a data port, time is required until the state of the data port is changed actually. Therefore, in the storage apparatus of the embodiment 4, the acceptance state 1502 is added to the port management table 1500 so as to allow information of a data port, which is scheduled to be caused to go down soon, to be shared by a plurality of storage controllers. This makes it possible to prevent ineffective data transfer to the storage controller connected to the data port to be caused to go down.

The example described above is directed to a case in which a storage controller causes a data port to go down. However, a data port to which an exchanged or additionally provided storage controller is connected may be caused to go up by a similar procedure.

Further, in a case where one of the edge interface and the management interface does not support the RDMA-Write-with-Immediate request, the storage controller may transmit a state changing instruction of a data port by an RDMA Send request such that the switch CPU receives it by an RDMA Receive request through the management interface.

In this case, it does not matter in what transmission order the RDMA Write for updating the port management table to be transmitted from the storage controller and the RDMA Send for the data port changing instruction are transmitted if the transmission is performed continuously. Further, instead of the storage controller transmitting the RDMA-Write-with-Immediate request from the edge interface, it may transmit an interrupt to the switch CPU 620. In this case, in response to reception of the interrupt, the switch CPU 620 changes the state of the data port.

Embodiment 5

A storage apparatus of an embodiment 5 is described with reference to FIGS. 19 and 20. Since the configuration of the storage apparatus of the embodiment 5 other than the Ethernet switch is similar to that of the storage apparatus of the embodiment 1, description of the configuration is omitted.

The storage apparatus of the embodiment 5 is characterized in that the Ethernet switch receiving an instruction from a storage controller updates contents of the port management table. This is effective in a case where it is confirmed that the storage controller has read out the port management table updated to the latest contents.

Figures 19, 20:
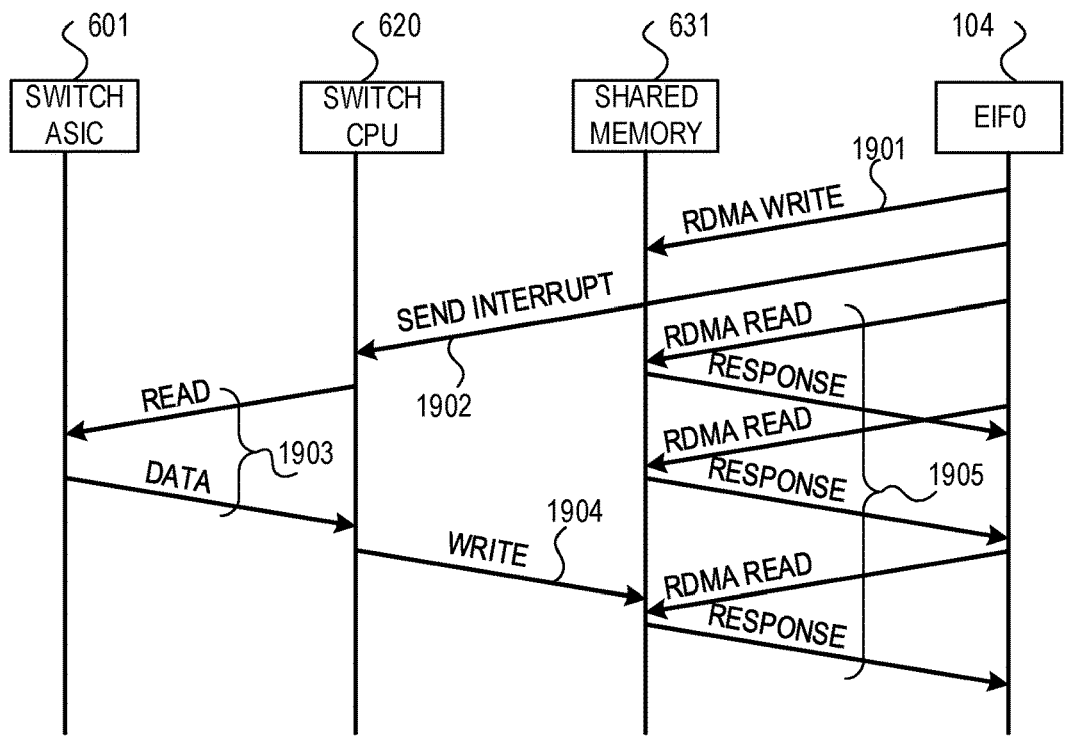
FIG. 19 is a view illustrating a sequence when the storage controller reads out the port management table from the Ethernet switch.
FIG. 20 is a view illustrating an update management table.

FIG. 19 is a view illustrating a port management table readout sequence from a storage controller in the storage apparatus of the embodiment 5. First, the storage controller transmits an RDMA Write request to the management interface from the edge interface 104 (1901). This request clears an update flag of an update management table placed in the shared memory to 0. In the following, description is given back of the sequence of FIG. 19 after the update management is described.

FIG. 20 is a view illustrating the update management table 2000. The update management table 2000 includes information 2001 for identifying an edge interface and a processor core on which the storage controlling program runs, and an update flag 2002. The update flag indicates that, for example, when it is "0," the port management table is not updated as yet, but when it is "1," the port management table is updated already.

In the update management table 2000, the update flag can be set for each of the edge interfaces and the processor cores. This makes it possible to confirm an update situation of the port management table for each of the storage controlling programs that run on the processor cores and for the edge interfaces.

Referring back to FIG. 19, the storage controller subsequently transmits an interrupt for the instruction to update the port management table to the switch CPU 620 (1902). Here, instead of the storage controller transmitting an interrupt, the storage controller may transmit an RDMA-Write-with-Immediate request similarly as in the embodiment 4 to instruct the switch CPU 620 to update the port management table.

The switch CPU 620 receives the interrupt and reads out the port status of the switch ASIC 601 (1903) and then writes a result of the readout into the port management table (1904). Further, the switch CPU 620 writes "1" indicating that update is completed into the update flag 2002 corresponding to the edge interface 104 of the update management table 2000 and the core of the storage controller.

In order to read out the port management table, the storage controller transmits an RDMA Read request from the edge interface 104 to the management interface 640. The management interface 640 receives the RDMA Read request and sends back the port management table to the edge interface 104 (1905). At this time, the storage controller reads out also the update management table 2000 simultaneously.

Although, in the sequence of FIG. 19, the update flag is cleared before the storage controller reads out the port management table (1901), the update flag may otherwise be cleared after the storage controller reads out the port management table. In this case, after the port management table is read out, the storage controller transmits an RDMA Write request and writes "0" indicating that update is not performed as yet into the update flag 2002 of the update management table 2000. The storage controller can confirm whether or not the port management table is updated already by reading out the update flag corresponding to the edge interface 104.

It is to be noted that the present invention is not limited to the embodiments described above and includes various modifications. For example, the embodiments described above are described in detail in order to explain the present invention clearly and the present invention is not necessarily restricted to embodiments that include all configurations described hereinabove. Further, it is possible to replace part of the configuration of a certain embodiment with the configuration of a different embodiment and also it is possible to add, to the configuration of a certain embodiment, the configuration of a different embodiment. Further, part of the configuration of any embodiment may be subject to addition, deletion or replacement of a different configuration.

Further, the configurations, functions, processing sections, processing means and so forth of the configurations described above may be implemented partly or entirely by hardware, for example, by designing them in the form of an integrated circuit. Further, the configurations, functions and so forth may be implemented by a processor interpreting and executing a program for implementing the functions. Information of programs, tables, files and so forth for implementing the functions can be stored into a memory and a recording medium of a recording apparatus such as a hard disk drive or a solid state drive.

Further, control lines and information lines are indicated only where they are necessary for description, and all of control lines or information lines of a product are not necessarily indicated. It may be considered that actually almost all configurations are connected to each other.

What is claimed is:

1. A storage apparatus, comprising:
a switch; and
a plurality of storage controllers configured to communicate with each other through the switch,
wherein the switch includes:
a switch processor,
a plurality of data ports,
a switch integrated circuit configured to perform data transfer between the data ports,
a memory, and
a management interface,
wherein one of the plurality of data ports and a management port of the management interface are connected to each other,
wherein the switch processor stores a status of the plurality of data ports acquired from the switch integrated circuit into the memory,
wherein the plurality of storage controllers access the management interface through the plurality of data ports and the management port, and receive the statuses of the plurality of data ports stored in the memory from the management interface,
wherein the plurality of storage controllers and the management interface are capable of performing data transfer by remote direct memory access,
wherein the switch processor places the statuses of the plurality of data ports into a shared memory region in the memory, and
wherein the plurality of storage controllers transmit a command for the remote direct memory access to the management interface to acquire the statuses of the plurality of data ports from the shared memory region.

2. The storage apparatus according to claim 1, wherein data transfer between the plurality of storage controllers and the management interface is set to a priority degree higher than that of data transfer between the plurality of storage controllers.

3. The storage apparatus according to claim 1, wherein a virtual network that performs data transfer between the plurality of storage controllers and the management interface is different from a virtual network that performs data transfer between the plurality of storage controllers.

4. The storage apparatus according to claim 1, wherein a frequency band of a link that connects the one of the plurality of data ports with the management port is smaller than a frequency band of links that connect the plurality of storage controllers with the plurality of data ports to each other.

5. The storage apparatus according to claim 1, wherein the management interface further includes an Ethernet port connected to a management network.

6. The storage apparatus according to claim 1, wherein the plurality of storage controllers instruct the switch processor to change the state of the plurality of data ports.

7. A method of reading out a data port status of a switch in a storage apparatus including a switch, and a plurality of storage controllers configured to communicate with each other through the switch, the switch including a switch processor, a plurality of data ports, a switch integrated circuit configured to perform data transfer between the data ports, a memory, and a management interface, one of the plurality of data ports and a management port of the management interface being connected to each other, the method comprising:
- storing, by the switch processor, a status of the plurality of data ports acquired from the switch integrated circuit into the memory;
- accessing, by the plurality of storage controllers, the management interface through the plurality of data ports and the management port, and receiving the statuses of the plurality of data ports stored in the memory from the management interface;
- placing, by the switch processor, the statuses of the plurality of data ports into a shared memory region in the memory; and
- transmitting, by the plurality of storage controllers, a command for the remote direct memory access to the management interface to acquire the statuses of the plurality of data ports from the shared memory region.

8. The method according to claim 7, further comprising:
instructing, by the plurality of storage controllers, the switch processor to change a state of the plurality of data ports.

9. The method according to claim 7, wherein
data transfer between the plurality of storage controllers and the management interface is set to a priority degree higher than that of data transfer between the plurality of storage controllers.

10. The method according to claim 7, wherein
a virtual network that performs data transfer between the plurality of storage controllers and the management interface is different from a virtual network that performs data transfer between the plurality of storage controllers.

11. The method according to claim 7, wherein
a frequency band of a link that connects the one of the plurality of data ports with the management port is smaller than a frequency band of links that connect the plurality of storage controllers with the plurality of data ports to each other.

* * * * *